United States Patent
Dress

(10) Patent No.: US 8,909,047 B2
(45) Date of Patent: Dec. 9, 2014

(54) SCALABLE OPTICAL BROADCAST INTERCONNECT

(71) Applicant: LightFleet Corporation, Vancouver, WA (US)

(72) Inventor: William B Dress, Camas, WA (US)

(73) Assignee: LightFleet Corporation, Vancouver, WA (US)

( * ) Notice: Subject to any disclaimer, the term of this patent is extended or adjusted under 35 U.S.C. 154(b) by 147 days.

(21) Appl. No.: 13/758,978

(22) Filed: Feb. 4, 2013

(65) Prior Publication Data

US 2014/0044430 A1 Feb. 13, 2014

Related U.S. Application Data

(60) Provisional application No. 61/633,034, filed on Feb. 3, 2012.

(51) Int. Cl.
- *H04J 14/00* (2006.01)
- *H04J 14/02* (2006.01)
- *H04B 10/27* (2013.01)
- *H04B 10/80* (2013.01)

(52) U.S. Cl.
CPC .............. *H04B 10/27* (2013.01); *H04B 10/801* (2013.01)
USPC ................................. 398/66; 398/82; 398/88

(58) Field of Classification Search
CPC .............. H04J 14/0204; H04J 14/0219; H04J 14/0228; H04J 14/0284
USPC .................. 398/58, 60, 61, 63, 66, 68, 82, 88
See application file for complete search history.

(56) References Cited

U.S. PATENT DOCUMENTS

| | | | |
|---|---|---|---|
| 5,101,480 A * | 3/1992 | Shin et al. ..................... | 710/317 |
| 6,445,470 B1 * | 9/2002 | Jenkins et al. .................. | 359/11 |
| 6,665,495 B1 | 12/2003 | Miles et al. | |
| 7,542,653 B2 * | 6/2009 | Johnson et al. ............... | 386/202 |
| 7,881,568 B2 * | 2/2011 | Lin ................................. | 385/15 |
| 8,086,101 B2 * | 12/2011 | Alaimo et al. .................. | 398/49 |
| 2010/0020806 A1 | 1/2010 | Vahdat et al. | |
| 2011/0052120 A1 * | 3/2011 | Tan et al. ......................... | 385/33 |

FOREIGN PATENT DOCUMENTS

WO 02/41663 5/2002

OTHER PUBLICATIONS

Notification, International Search Report and Written Opinion from PCT/US2013/024672, dated Jul. 8, 2013.
William Dress, "Properties of LIghtfleet's direct broadcast optical interconnect", Jun. 15, 2010, pp. 1-10.
William Dress, "Interconnects for large computer systems", Aug. 21, 2012, pp. 1-36.

\* cited by examiner

*Primary Examiner* — Dalzid Singh
(74) *Attorney, Agent, or Firm* — John Bruckner PC

(57) ABSTRACT

A modular interconnect includes an mn-by-mn fully connected, direct broadcast, point-to-point, all-to-all interconnect fabric, wherein the mn-by-mn fully connected, direct broadcast, point-to-point, all-to-all interconnect fabric is non-blocking and congestion free, and wherein m is an integer≥2 and n is an integer≥2. Operating the modular interconnect includes distributing each of mn inputs to each and every one of mn outputs.

7 Claims, 3 Drawing Sheets (Modular Interconnect)

(Modular Interconnect)

(Extended Interconnect)

SCALABLE OPTICAL BROADCAST INTERCONNECT

CROSS-REFERENCE TO RELATED APPLICATION

This application claims a benefit of priority under 35 U.S.C. 119(e) from provisional patent application U.S. Ser. No. 61/633,034, filed Feb. 3, 2012, the entire contents of which are hereby expressly incorporated herein by reference for all purposes.

BACKGROUND

Most computer interconnects serve a limited number of nodes or endpoints. Larger interconnects are typically built up from smaller interconnect modules by joining one interconnect module to another in the form of trees, fat trees, and other networks of switches (known as switched fabrics) configured in a variety of different topologies.

Each switch in such a network may connect to one or more host computers and connect to one or more storage devices. In addition, there may be switch-to-switch connections and switch-to-concentrator connections. The switch-to-switch connections are typically of higher bandwidth that the switch-to-host or switch-to-storage connections so that data between switches can be distributed to multiple hosts or storage devices. A concentrator, also referred to as a level-2 switch, takes input from one or more switches, forming a bridge between one or more switched fabrics and other devices such as gateways to other data networks. The flow of data in these implementations must be internally managed as to data paths, packing messages for switch-to-switch traffic and unpacking such messages for distribution to individual endpoints (host computers or storage devices).

Referring to FIG. 1 (Prior Art) illustrates a typical n-way (or n-by-n) interconnect based on broadcast light as described in U.S. Pat. No. 7,970,279 ("N-way serial-channel interconnect"). The figure portrays a fully connected, n-by-n interconnect from the inputs (typically from n nodes or endpoints) to the outputs (typically to the same n nodes or endpoints).

Broadcast distribution module 100 (labeled "DBOI" for direct-broadcast, optical interconnect) distributes information encoded in light (in the preferred embodiment) or other data carrier means from each of the n inputs 110. This broadcast distribution is indicated by the plurality of fan-out and fan-in lines labeled 115. In the preferred embodiment, these lines 115 schematically indicate the broadcast distribution of light broadcast from each of the inputs 110 and collection to each of the output lines 120. The use of "light" in this description is not meant to restrict to optical means as any carrier of information that is capable of being manipulated in the manner indicated by FIG. 1 is valid in the context of FIG. 1. In the optical version of the interconnect, described by the above-referenced patent, the light broadcast from the several inputs is collected by lenses and focused on the outputs 120 which are multi-mode fibers in the optical case and transmission lines or cables in the electrical case. Each of the four collection points (the tail of the arrows 120) contains n signals as four replications of the input data stream of the n inputs 110. In the original implementation of the DBOI interconnect, n was 32 and each input stream is split four ways by an optical fan-out device replication of each of the 32 data streams. These optical signals are then combined into four detector arrays or fiber-optic bundles, each containing a copy of the original 32 input data streams. Hence the depiction of 4 data streams 120 exiting the broadcast distribution module 100.

Note that the number n=32 and the optical fan-out of four were chosen for convenience only. Other choices are possible. For example, a 128-way interconnect might have 16-fold optical or electrical fan-outs leading to 16 output bundles labeled 120 instead of the four depicted in FIG. 1. The partitions 135 are meant to illustrate this four-fold modular structure of this particular embodiment.

Still referring to FIG. 1, module 130 (labeled "EONIC" for electro-optical node interface controller) receives the optical signals 120 (in the preferred embodiment) and converts them into electrical signals where each of the n signals in each of the four bundles represented by an arrow 120 are fanned out 8 ways, carrying 8 copies of each original input signal 110, thus giving a total number of signals of n=32 in each partition. Each of the partitions separated by lines 135 in module 130 contains n/4 outputs or endpoints 140. For example, the top partition in module 130 would contain, for n=32, outputs to nodes 1 through 8; the second partition, outputs 9 through 16; and so on. Thus it is easy to see that each input stream 110 is represented at each output stream 140.

Note particularly that there are no switches or routing mechanisms inside either module 100 or module 130. That is, data are free to flow from any of the n inputs 110 to any of the n outputs 140 without any impediment. The immediate result is that there can be no data congestion within the interconnect represented by FIG. 1.

In practice, module 130 contains additional software and/or hardware to collect, store, and gate the various digital data streams according to encoded destinations as well as flow-control circuitry needed to prevent contention at the output nodes 140. These additional functions to the fan-out and fan-in circuits were described in the above-referenced U.S. Pat. No. 7,970,279.

Referring to FIG. 2 (Prior Art) illustrates how to separately interconnect four sets of n nodes, each set being fully interconnected within itself. The resulting 4n nodes are, of course, not fully interconnected.

The four modules 200 each have independent inputs 210 of n channels each. As described above, each set is distributed optically (in the preferred embodiment) and presented to the four sets of optical outputs 220 in each interconnect row. The four EONICs 230 receive the four sets of optical inputs and distribute and combine them, as described above, to the four sets of outputs 240. The 4n independent inputs 210 are treated in groups of four such that a data stream presented to the top module 200, for example, cannot appear on any of the three bottom modules 230. Note that the four sections indicated by the sequence of indicators 200, 210, 220, 230, and 240, are not distinguished since they are copies of the same n-by-n interconnect.

Today's computing clusters as envisioned for data centers, cloud computing, and supercomputer applications are meant to serve more than a few dozen nodes or endpoints that are subsumed by a single switched interconnect. Typical methods of interconnect extensions make use of various problematic devices to ensure that each node in a many-node system can be connected to any other node. Note that the possibility of any given node-to-node connection is not necessarily permanently established nor may such a connection be established when desired. For example, the switches and associated routing hardware within, and the software controlling, these switched networks may become internally blocked by message traffic in competing data paths. In addition to data congestion in a switch network, data must often be passed from switch to switch in the form of discrete hops, making the node-to-node communication take place in a series of stages, where delay and blocking may occur at each stage. In addition, the heterogeneous nature of the diverse hardware elements in such a switched fabric of switches adds additional complications and costs to building and maintaining a data center, computing or storage cloud, or supercomputer cluster.

Heretofore, there has been no approach to interconnecting nodes that obviates the above-discussed deficiencies. What is needed is a better technology to interconnect nodes.

SUMMARY

There is a need for the following aspects of the present disclosure. Of course, the present disclosure is not limited to these aspects.

According to an embodiment of the present disclosure, an apparatus comprises a modular interconnect including an mn-by-mn fully connected, direct broadcast, point-to-point, all-to-all interconnect fabric, wherein the mn-by-mn fully connected, direct broadcast, point-to-point, all-to-all interconnect fabric is non-blocking and congestion free, and wherein m is an integer≥2 and n is an integer≥2. According to another embodiment of the present disclosure, a method comprises operating a modular interconnect including an mn-by-mn fully connected, direct broadcast, point-to-point, all-to-all interconnect fabric, wherein the mn-by-mn fully connected, direct broadcast, point-to-point, all-to-all interconnect fabric is non-blocking and congestion free, wherein m is an integer≥2 and n is an integer≥2, including distributing each of mn inputs to each and every one of mn outputs.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION

Figure 1:
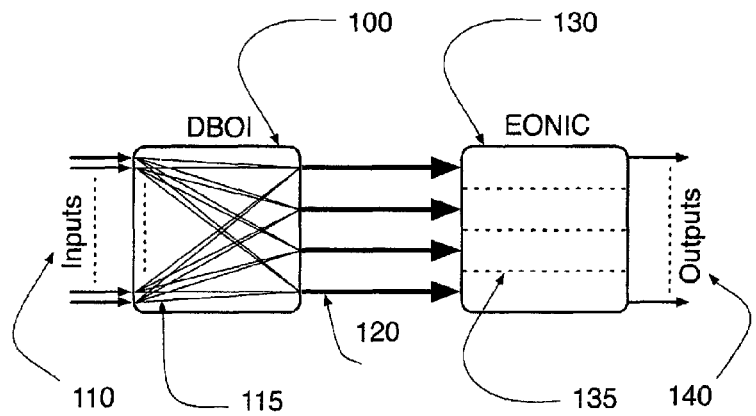
FIG. 1 Illustrates a direct broadcast, optical interconnect that fully interconnects n nodes as prior art.

Embodiments presented in the present disclosure and the various features and advantageous details thereof are explained more fully with reference to the nonlimiting embodiments that are illustrated in the accompanying drawings and detailed in the following description. Descriptions of well known techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

The below-referenced U.S. patents disclose embodiments that were satisfactory for the purposes for which they are intended. The entire contents of U.S. Pat. Nos. 7,450,857, 7,630,648, 7,796,885, 7,970,279, and 8,081,876 are hereby expressly incorporated by reference herein for all purposes.

The present invention circumvents the need for heterogeneous hardware elements in an interconnect fabric and eliminates the need for switches in the interconnect fabric. The interconnect fabric resulting from this invention can use identical copies of a direct-broadcast interconnect (module) that is strictly non-blocking and congestion free. The basic idea is to connect multiple direct-broadcast interconnect modules in a configuration that allows direct connections between any of the expanded inputs to any of the expanded outputs (nodes) without intermediate switches or re-routing of data. That is, all inputs in the extended system (modular interconnect) are fully connected to all outputs permanently, allowing a continuous and uninterrupted flow of data between any input node and any output node.

Thus, the invention relates generally to the field of interconnects for computer systems and/or their subsystems as well as networks and/or their subsystems. More particularly, the invention relates to extending the number of nodes covered and/or addressed by a single direct-broadcast interconnect to some multiple thereof.

In general, the context of the invention can include the distribution and gathering of data by optical signals, a mix of optical and electrical (digital) signals, as well as purely electrical (digital) signals. The context of the invention can also include the transfer of data by incoherent light and/or coherent light transmissions. The context of the invention can even include the transfer of data by acoustic transmission. The physical context of the invention can include network(s), computer system(s), node(s), circuit board(s) and/or modems, especially for high-speed and high-volume data transfers among and between a plurality of endpoints, computers, computing devices, and/or storage devices.

The invention can include pulse-width modulation and/or demodulation using precision timing to implement a very high-rate transfer. The invention can include free-space transmissions or coaxial cable or data bus or wires for RF and free-space transmissions or light pipes or optical fibers for light.

The invention can include high speed modulation of a carrier by a bit stream, said modulation optionally taking place in an all digital process. The invention can include high speed demodulation of a carrier to recover a bit stream, said demodulation optionally taking place in an all digital process.

The invention can include an all-digital process to modulate and detect a carrier encoded as described above. If present, the analog portion of the modulator and demodulator can be typical phase, frequency, and amplitude devices, well known to practitioners of the art.

EXAMPLES

Specific exemplary embodiments will now be further described by the following, nonlimiting examples which will serve to illustrate in some detail various features. The following examples are included to facilitate an understanding of ways in which embodiments of the present disclosure may be practiced. However, it should be appreciated that many changes can be made in the exemplary embodiments which are disclosed while still obtaining like or similar result without departing from the scope of embodiments of the present disclosure. Accordingly, the examples should not be construed as limiting the scope of the present disclosure.

Example 1

Figure 2:
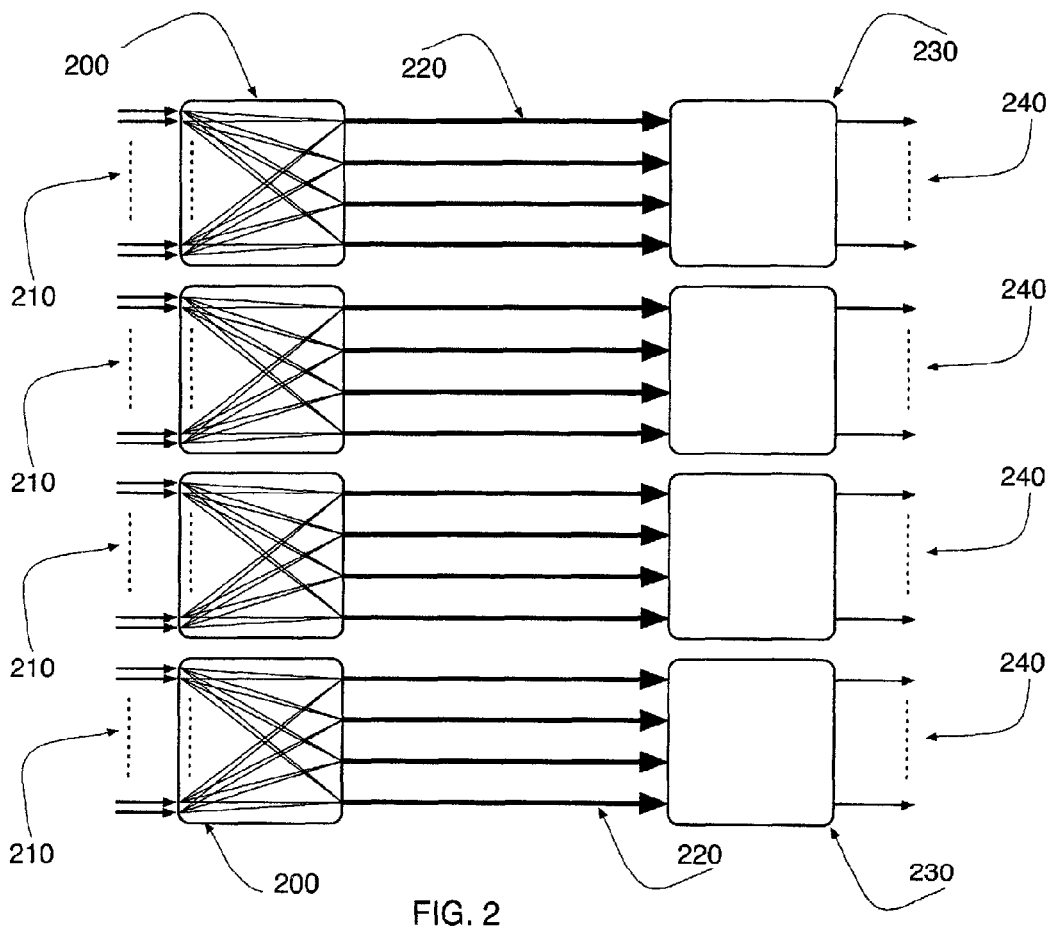
FIG. 2 Illustrates a group including four independent direct broadcast, optical interconnects as shown in FIG. 1; also prior art. Here, four sets of n nodes each are connected as independent sets of four n fully connected nodes.
Figure 3:
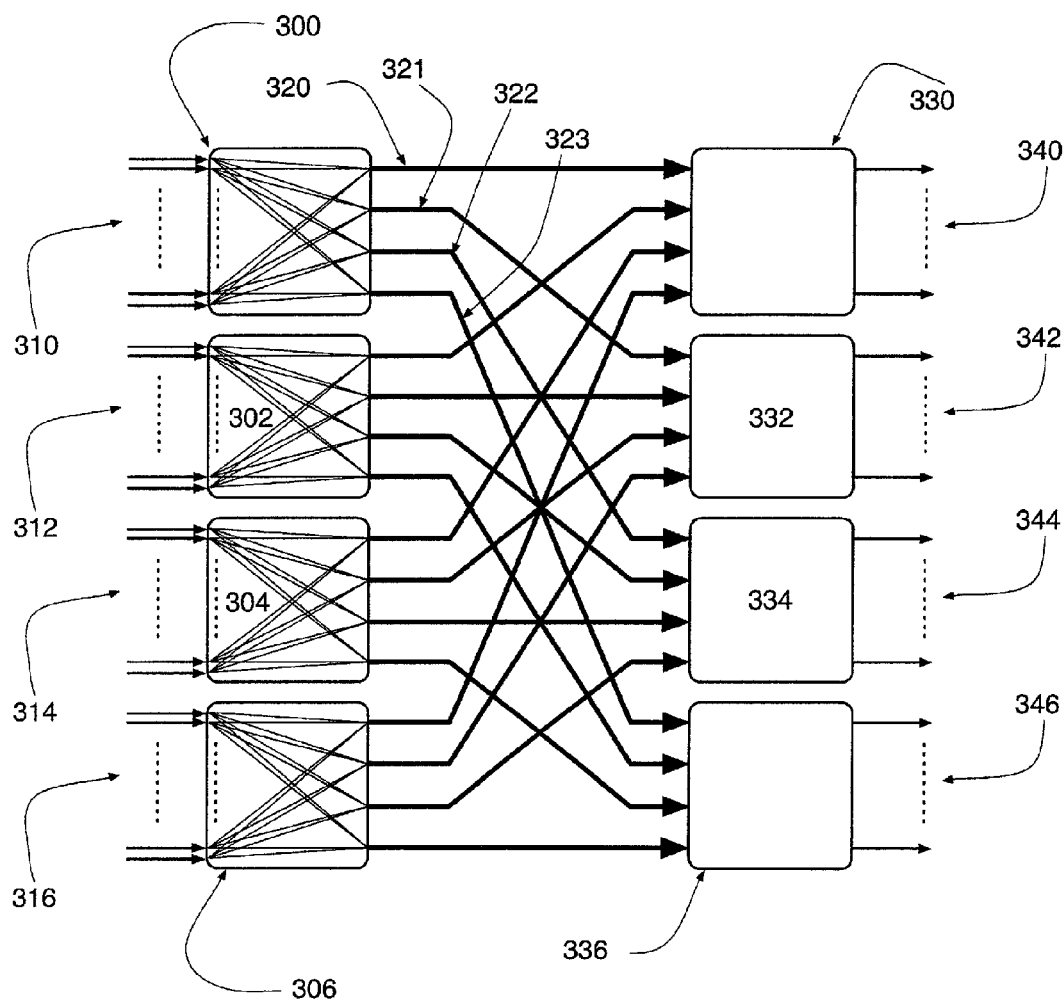
FIG. 3 Illustrates additional structure interconnecting all nodes in the group illustrated in FIG. 2 so that all 4n nodes are fully interconnected in a modular interconnect representing an embodiment of the present disclosure.

FIG. 3 (Modular Interconnect) shows the same set of four interconnects as seen in FIG. 2, but with the important improvement that each of the four direct broadcast interconnects is fully connected to one another so that each of the 4n inputs is present at each and every one of the 4n outputs. This FIG. 3 illustrates the central concept of the present invention: an enlarged fully connected system comprised of smaller modules, indicating a method of interconnect extension or scaling based on a replication of certain broadcast distribution modules.

Still referring to FIG. 3, the four broadcast distribution modules representing the broadcast distribution of the optical input signals are fully connected with one another and identified with labels 300, 302, 304, and 306. This is an important distinction from FIG. 2, where each of the isolated modules was identified as being identical by the same label 200. In the first row of FIG. 3, the inputs 310 to module 300 represent the first n inputs to the composite (modular) interconnect, the composite interconnect being the example shown in FIG. 3 and an embodiment of the present invention. Inputs 312 in the next set represent inputs n+1 through 2n to broadcast distribution module 302. Inputs 314 in the third set represent inputs 2n+1 through 3n to broadcast distribution module 304. Finally, inputs 316 to broadcast distribution module 306 represent inputs 3n+1 through 4n. The total number of inputs to the composite interconnect shown in the figure is then 4n and each input may be distinct (in a preferred embodiment) or there may be duplicates for the purpose of redundancy in connectivity and in endpoint hardware.

Distribution module 300 has, as does module 200 in FIG. 2, four output channels each containing a copy of the n inputs 310 to that module. (Again, "four" being representative of a particular implementation of the generic interconnect.) The first set of outputs 320 serves as the first group of inputs to the node interface controller 330. The second set of outputs 321 from module 300 serves as the first group of inputs to the node interface controller 332 in the second row, while the third set of outputs 322 from module 300 serves as the first group of inputs to the node interface controller 334 in the third row. Finally, the set of outputs 323 from the module 300 serves as the first group of inputs to the node interface controller 336 in the fourth and final row of this example.

This pattern is repeated in each of the subsequent modules as shown by the connections between the remaining broadcast distribution modules 302, 304, and 306 such that such that each broadcast distribution module is connected to each node interface controller and each node interface controller receives connections from each broadcast distribution module. In this way, information presented to any chosen input (with sets of n inputs labeled 310, 312, 314, and 316) may be received at any of the outputs (with n outputs in each of the output sets 340, 342, 344, and 346). In this way, the cross-connected composite (modular) interconnect represented in FIG. 3 shows a 4n-by-4n fully connected, direct broadcast, point-to-point, all-to-all interconnect which is strictly nonblocking and congestion free.

The functionality of the node interface controllers in FIG. 3 are not depicted nor referenced in the drawing; this being described in detail in U.S. Pat. No. 7,970,279 ("N-way serial-channel interconnect") referenced above. However, there are important differences between the node interface controllers needed for the interconnects represented in FIG. 3 from those of the interconnect of FIG. 1. Those differences are mainly one of multiplicity and will be described here. The function of the fan-out circuits mentioned above is required in the node interface controllers 330, 332, 334, and 332. However, these fan-outs must be 1-by-n instead of 1-by-8 as in the devices of FIG. 1 and FIG. 2. The reason for the 1-by-n fan-out is that each of the four bundles of n inputs to each node interface controller are not necessarily copies of each other. For the exit side of the node interface controllers, there must be a 4n-by-1 fan-in so that each of the different $4n$ inputs to each node interface controller may be present on each of the 4n output lines (in the interconnects of FIG. 1 and FIG. 2, these fan-ins were n-by-1). Again, these fan-out and fan-in devices are known to those of skill familiar with the art of digital electronic circuitry and are available to digital designers either as integrated-circuit devices or circuit representations of standard and known design. Additional circuitry including intermediate and temporary storage, logic for certain path decisions, and for addressing flow control may be incorporated into any actual implementation without altering the scope or purpose of the present disclosure.

Example 2

Figure 4:
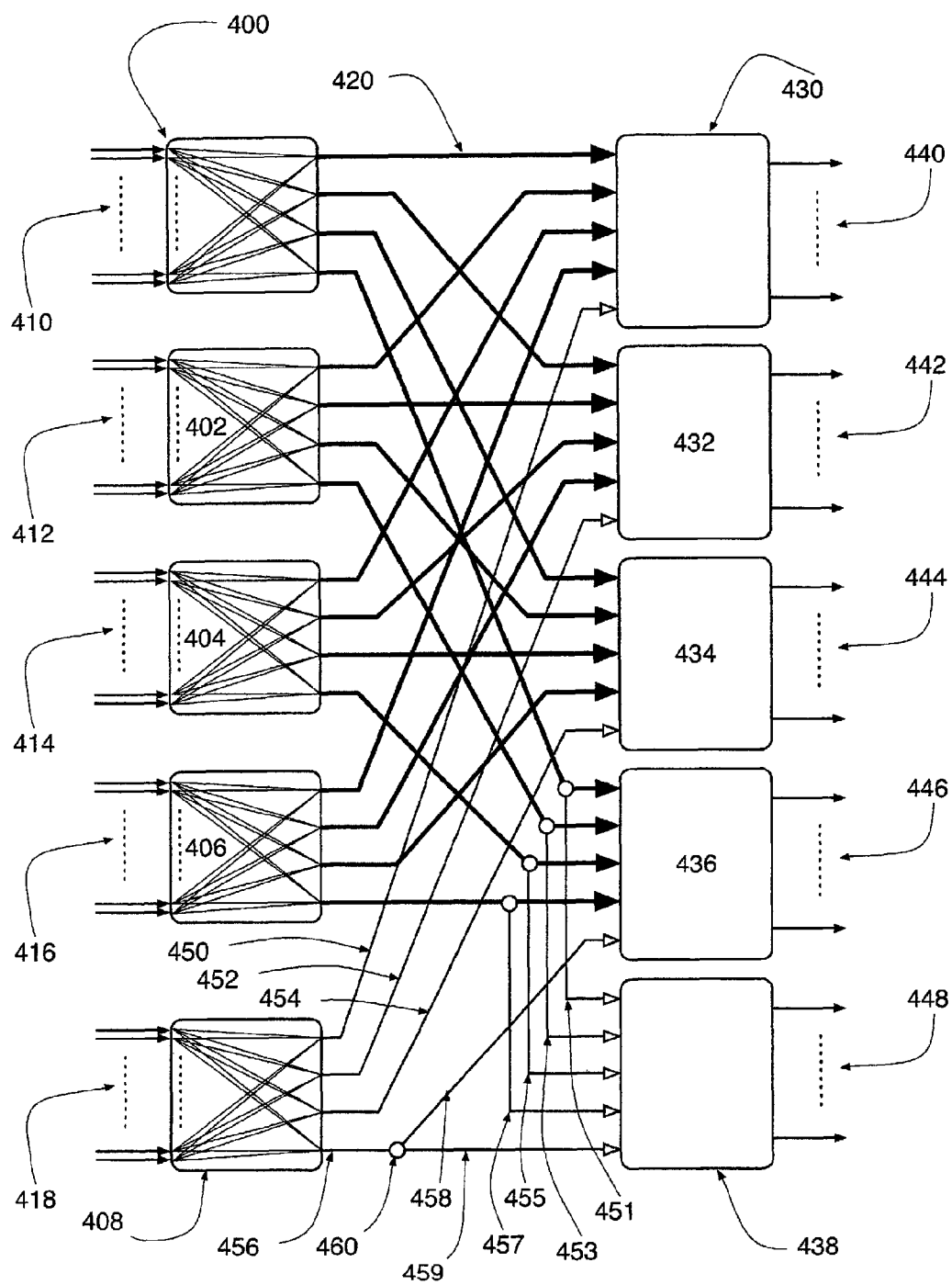
FIG. 4 Illustrates additional structure extending the composite (modular) interconnect of FIG. 3 such that 4n+n nodes are fully interconnected representing an embodiment of the present disclosure. The scalability or extensibility of the composite interconnect is thereby illustrated.

FIG. 4 (Extended Interconnect) illustrates an extension to the interconnect of FIG. 3 by adding another direct broadcast n-by-n interconnect for a fifth set of modules. This figure depicts a separate innovation of the present disclosure: how to incrementally extend a modular interconnect one module at a time while retaining the fully connected, broadcast property of the original concept illustrated in FIG. 1 as disclosed fully in the above-referenced patents.

Referring to FIG. 4, the first four rows represent a replication of FIG. 3 in its entirety (with the important addition of additional inputs to each of the node interface controller modules). The incremental extension of the interconnect is contained in the bottom row of the figure. Inputs 410, 412, 414, and 416 correspond to inputs 310, 312, 314, and 316 of FIG. 3. Similarly the broadcast distribution modules 400, 402, 404, and 406 correspond to broadcast distribution modules 300, 302, 304, and 306 in FIG. 3 and node interface controller modules 430, 432, 434, and 436 correspond to node interface controller modules 330, 332, 334, and 336 of FIG. 3. The sets of bold arrows with solid heads representing the interconnections between the broadcast distribution modules 400, 402, 404, and 406 and node interface modules (exemplar labeled 420) is a replication of those present in FIG. 3.

The differences between FIG. 3 and FIG. 4 start with the addition a fifth row, including inputs 418, broadcast distribution module 408, node interface controller 438, and interconnect outputs 448 is, as far as hardware and functionality, apart from connections, can be simply copies of any one of the other rows. The four copies of the n inputs 418 of broadcast distribution module 408 are shown on the exit of said module as thin arrows with hollow heads labeled 450, 452, 454, and 456. Each node interface controller, 430, 432, 434, 438 (and now) 438 have a fifth input bundle containing n data lines (as do the other input lines represented by the bold, solid-head arrows). The n data lines 450 connect broadcast distribution module 408 to node interface controller 430 on its fifth input. Likewise, the n data lines 452 connect broadcast distribution module 408 to node interface controller 432 on its fifth input; the n data lines 454 connect broadcast distribution module 408 to node interface controller 434 on its fifth input; and the n data lines 458 connect broadcast distribution module 408 to node interface controller 436 on its fifth input after duplication by device 460.

Since each broadcast distribution module has only four output bundles (example is line 420) and each node interface controller now has five input bundles (represented by the heads of the several hollow-headed arrows), there must be provided a structure for duplication on at least one (in the example of FIG. 4) of the output bundles from one of each of the broadcast distribution modules. Consider broadcast distribution module 408. Its corresponding duplication or cloning device is represented by the open circle 460 which simply provides a copy of each of the n signals present on bundle 456. The duplication structure is not indicated since it is well known to those of skill familiar with the state of the art of signal propagation (e.g. a simple electrical fan-out in the electrical case or an optical fan-out in the optical case). Duplication device 460 provides this duplication or fan-out whereby a copy of the n inputs 418 is present on line 456 following the signal distribution and collection in the interior of module 408.

The outputs of device 460 are copies of its inputs. One copy is presented on line 458, as stated above, providing the fifth input to node interface controller 436; the second copy is presented on line 459, providing the fifth input to the fifth node interface controller 438. In a similar manner, one output bundle of each of the other four node interface controllers is presented to a duplication device represented by the other four open circles in FIG. 4. Specifically, an output of broadcast distribution module 400 is duplicated into two copies, the first copy providing the first input to node interface controller 436 while the second copy appears on line 451 and provides the first input to node interface controller 438. Likewise, an output of broadcast distribution module 402 is duplicated into two copies, the first copy providing the second input to node interface controller 436 while the second copy appears on line 453 and provides the second input to node interface controller 438; output of broadcast distribution module 404 is duplicated into two copies, the first copy providing the third input to node interface controller 436 while the second copy appears on line 455 and provides the third input to node interface controller 438; and finally, output of broadcast distribution module 406 is duplicated into two copies, the first copy providing the fourth input to node interface controller 436 while the second copy appears on line 457 and provides the fourth input to node interface controller 438.

In this way, each of the five node interface controllers 430, 432, 434, 436, and 438 receive inputs from each of the broadcast distribution modules 400, 402, 404, 406, and 408 such that all signals present on the entire set of inputs 410, 412, 414, 416, and 418 are presented to each of the five node interface controllers 430, 432, 434, 436, and 438. The functions of the node interface controllers, as explained above, ensure that each of the 5n output lines 440, 442, 444, 446, and 448 are directly connected to each of the 5n input lines 410, 412, 414, 416, and 418. Thus, the extended interconnect shown in FIG. 4 forms a complete 5n-by-5n broadcast interconnect that is strictly non-blocking, congestion free, and supports all-to-all connectivity at full data channel rates. The treatment of contention at the exit connections of each electro-optic node interface controller is not a subject of this present disclosure as it is discussed in detail in U.S. Pat. No. 7,970,279 ("N-way serial-channel interconnect") referenced above.

There are intermediate interconnects possible as well as interconnects extended beyond those embodiments shown in FIGS. 3-4. In particular, the invention based on multiple n-by-n direct-broadcast interconnects of the type shown in FIG. 1 may be used to form direct-broadcast, single-layer, fully connected interconnects of the type mn-by-mn where n is the number of nodes in a single component interconnect and m is any integer greater than zero. As an example, if n=32 (as used above), then interconnects serving 32, 64, 96, 128, 160, and so on may be achieved merely by changing the node interface controller modules to add more input bundles (of n inputs each, as needed), adding a set of fan-out circuits for each additional input, increasing the multiplicity of the fan-in circuits leading to the interconnect outputs, and making the appropriate internal connections.

DEFINITIONS

The phrase program elements is intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" "mechanism for" and/or "step for". Subgeneric embodiments of the invention are delineated by the appended independent claims and their equivalents. Specific embodiments of the invention are differentiated by the appended dependent claims and their equivalents.

What is claimed is:

1. An apparatus, comprising a modular interconnect including an mn-by-mn fully connected, direct broadcast, point-to-point, all-to-all interconnect fabric, wherein the mn-by-mn fully connected, direct broadcast, point-to-point, all-to-all interconnect fabric is non-blocking and congestion free, and wherein m is an integer≥2 and n is an integer≥2,
   wherein the interconnect fabric includes no switches and no routers,
   wherein the mn-by-mn fully connected, direct broadcast, point-to-point, all-to-all interconnect fabric includes m direct-broadcast, point-to-point n-by-n interconnects each of which is non-blocking and congestion free and
   wherein the mn-by-mn fully connected, direct broadcast, point-to-point, all-to-all interconnect fabric includes m electro-optic node interface controllers, each of the m electro-optic node interface controllers coupled to each of the m direct-broadcast, point-to-point n-by-n interconnects.

2. The apparatus of claim 1, further comprising mn nodes coupled both to the m direct-broadcast, point-to-point n-by-n interconnects and to the m electro-optic node interface controllers.

3. The apparatus of claim 1, further comprising i) another direct broadcast n-by-n interconnect coupled to each of the m electro-optic node interface controllers and ii) another electro-optic node interface controller coupled both to the another direct-broadcast n-by-n interconnect and each of the m direct broadcast n-by-n interconnects.

4. The apparatus of claim 3, wherein the another direct broadcast n-by-n interconnect is coupled both to one of the m electro-optic node interface controllers and to the another electro-optic node interface controller via a duplication fan-out device.

5. The apparatus of claim 4, further comprising (m+1)n nodes coupled both to a) the m direct-broadcast, point-to-point n-by-n interconnects and b) the another direct broadcast n-by-n interconnect and to a) to the m electro-optic node interface controllers and b) the another electro-optic node interface controller.

6. A method, comprising operating a modular interconnect including an mn-by-mn fully connected, direct broadcast, point-to-point, all-to-all interconnect fabric, wherein the mn-by-mn fully connected, direct broadcast, point-to-point, all-to-all interconnect fabric is non-blocking and congestion free, wherein m is an integer≥2 and n is an integer≥2, including distributing each of mn inputs to each and every one of mn outputs,
   wherein operating includes inputting n inputs to a first direct-broadcast, point-to-point n-by-n interconnect and inputting n+1 through 2n inputs to a second direct-broadcast, point-to-point n-by-n interconnect and
   wherein operating includes distributing a first copy of the n inputs from the first direct-broadcast, point-to-point n-by-n interconnect to a first node interface controller, distributing a second copy of the n inputs from the first direct-broadcast, point-to-point n-by-n interconnect to a second node interface controller, distributing a first copy of the n+1 through 2n inputs from the second direct-broadcast, point-to-point n-by-n interconnect to the first node interface controller and distributing a second copy of the n+1 through 2n inputs from the second direct-broadcast, point-to-point n-by-n interconnect to the second node interface controller.

7. The method of claim 6, further comprising extending the modular interconnect wherein operating includes
   inputting another n inputs to another direct-broadcast, point-to-point n-by-n interconnect,
   distributing a first copy of the another n inputs from the another direct-broadcast, point-to-point n-by-n interconnect to the first node interface controller,
   distributing a second copy of the another n inputs from the another direct-broadcast, point-to-point n-by-n interconnect to the second node interface controller,
   distributing another copy of the first n inputs from the first direct-broadcast, point-to-point n-by-n interconnect to another node interface controller via a first duplication fan-out device,
   distributing another copy of the second n inputs from the second direct-broadcast, point-to-point n-by-n interconnect to the another node interface controller via a second duplication fan-out device and distributing another copy of the another n inputs from the another direct-broadcast, point-to-point n-by-n interconnect to the another node interface controller via another duplication fan-out device.

* * * * *